(12) United States Patent
Chang

(10) Patent No.: US 11,658,834 B2
(45) Date of Patent: May 23, 2023

(54) POWER SOURCING EQUIPMENT, POWERED DEVICE AND LINE LOSS DETECTION METHOD FOR POWER OVER ETHERNET

(71) Applicant: WISTRON NEWEB CORPORATION, Hsinchu (TW)

(72) Inventor: Hung-Ming Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 130 days.

(21) Appl. No.: 17/352,418

(22) Filed: Jun. 21, 2021

(65) Prior Publication Data

US 2022/0052860 A1 Feb. 17, 2022

(30) Foreign Application Priority Data

Aug. 13, 2020 (TW) .................................. 109127461

(51) Int. Cl.
*H04L 12/10* (2006.01)
*H04L 12/12* (2006.01)

(52) U.S. Cl.
CPC .............. *H04L 12/10* (2013.01); *H04L 12/12* (2013.01)

(58) Field of Classification Search
CPC ... H04L 12/10; H04L 12/12; H04L 12/40045; G01R 27/16; G01R 27/02; G01R 27/00
See application file for complete search history.

(56) References Cited

U.S. PATENT DOCUMENTS

| 9,389,662 | B2 | 7/2016 | Chiu | |
|---|---|---|---|---|
| 2006/0093017 | A1* | 5/2006 | Gong | H02M 3/33507 375/134 |
| 2008/0129118 | A1* | 6/2008 | Diab | H04L 12/10 307/35 |
| 2008/0164890 | A1* | 7/2008 | Admon | H04L 12/10 324/713 |

(Continued)

FOREIGN PATENT DOCUMENTS

| CN | 104914287 B | * 11/2017 |
| CN | 106789109 B | 9/2019 |
| TW | I489817 B | 6/2015 |

OTHER PUBLICATIONS

English translation of CN-104914287-B (Year: 2017).*

*Primary Examiner* — Jaweed A Abbaszadeh
*Assistant Examiner* — Brian J Corcoran
(74) *Attorney, Agent, or Firm* — McClure, Qualey & Rodack, LLP

(57) ABSTRACT

A power sourcing equipment (PSE), a powered device (PD) and a line loss detection method for Power over Ethernet (PoE) are provided. The PD receives a voltage/current information transmitted by the PSE to obtain an output voltage value and an output current value thereof, and the PSE receives an input voltage value returned by the PD, such that the PSE and the PD can both calculate a line power loss therebetween based on the input voltage value of the PD, the output voltage value and the output current value of the PSE; alternatively, the PD obtains the input voltage value through a voltage detection circuit under at least one state point of a power consumption that is known, and calculates, according to the output voltage value of the PSE and a known maximum power consumption of the PD, a maximum line power loss therebetween.

17 Claims, 6 Drawing Sheets

(56) References Cited

U.S. PATENT DOCUMENTS

| | | | |
|---|---|---|---|
| 2008/0229120 A1* | 9/2008 | Diab | H04L 12/66 |
| | | | 324/105 |
| 2008/0252307 A1* | 10/2008 | Schindler | G06F 1/266 |
| | | | 324/691 |
| 2008/0311877 A1* | 12/2008 | Darshan | G06F 1/266 |
| | | | 455/402 |
| 2010/0182024 A1* | 7/2010 | Yu | H04L 12/10 |
| | | | 324/713 |
| 2012/0173900 A1* | 7/2012 | Diab | H04L 12/10 |
| | | | 713/310 |

\* cited by examiner

POWER SOURCING EQUIPMENT, POWERED DEVICE AND LINE LOSS DETECTION METHOD FOR POWER OVER ETHERNET

CROSS-REFERENCE TO RELATED PATENT APPLICATION

This application claims the benefit of priority to Taiwan Patent Application No. 109127461, filed on Aug. 13, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to Power over Ethernet (PoE), and more particularly to a power sourcing equipment (PSE), a powered device (PD) and a line loss detection method for the PoE.

BACKGROUND OF THE DISCLOSURE

With Power over Ethernet (PoE) gradually increasing in wattage, the currently under development IEEE 802.3bt 2.0 standard (also known as PoE++ or 4PPoE) will provide a powered device (PD) up to 71 watts (W), and a minimum output power of a power sourcing equipment (PSE) is 90 W. In addition, Power over HDBaseT (PoH) of HDBaseT Alliance also defines that the power supply can be up to 95 W. Therefore, in such a high-power application, if a PoE system cannot detect line loss between the PSE and the PD, a use of poor quality, damaged or aging wires will increase intangible loss and waste, and may even cause safety concerns. However, the existing PD can perform Under Voltage Lock Out (UVLO) for an input terminal, that is, when a voltage drop of the line reaches a certain level, the PD cannot be activated, but there is yet no mechanism for detecting the line loss. In addition, even though the existing PSE can measure output voltage, current and power consumption, the line loss between the PSE and the PD is unable to be detected. Therefore, designing a PoE line loss detection method has become an important issue in the art.

SUMMARY OF THE DISCLOSURE

In response to the above-referenced technical inadequacies, the present disclosure provides a line loss detection method for Power over Ethernet (PoE), performed in a power sourcing equipment (PSE) of a PoE system, the PSE is coupled with a powered device (PD) of the PoE system through an Ethernet port of the PSE, and the line loss detection method includes the following steps: receiving an input voltage value transmitted back from the PD; and calculating a line power loss between the PSE and the PD according to the input voltage value of the PD, and an output voltage value and an output current value of the PSE.

A second embodiment of the present disclosure provides a line loss detection method for PoE, performed in a PD of a PoE system, the PD is coupled with a PSE of the PoE system, and the line loss detection method includes the following steps: receiving a voltage/current information transmitted from the PSE to obtain an output voltage value and an output current value of the PSE; and obtaining an input voltage value of the PD by a voltage detection circuit, and calculating a line power loss between the PSE and the PD according to the input voltage value of the PD, the output voltage value and the output current value of the PSE.

A third embodiment of the present disclosure provides a line loss detection method for PoE, performed in a PD on a PoE system, the PD is coupled with a PSE of the PoE system, and the line loss detection method includes the following steps: obtaining an output voltage value of the PSE, and obtaining an input voltage value of the PD through a voltage detection circuit under at least one state point of a power consumption that is known; calculating a current value of the PD according to the power consumption and the input voltage value, and calculating a line impedance between the PSE and the PD according to the output voltage value of the PSE, the input voltage value of the PD, and the current value; and calculating a maximum current value of the PD according to a maximum power consumption of the PD that is known, and calculating a maximum line power loss between the PSE and the PD according to the maximum current value and the line impedance.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
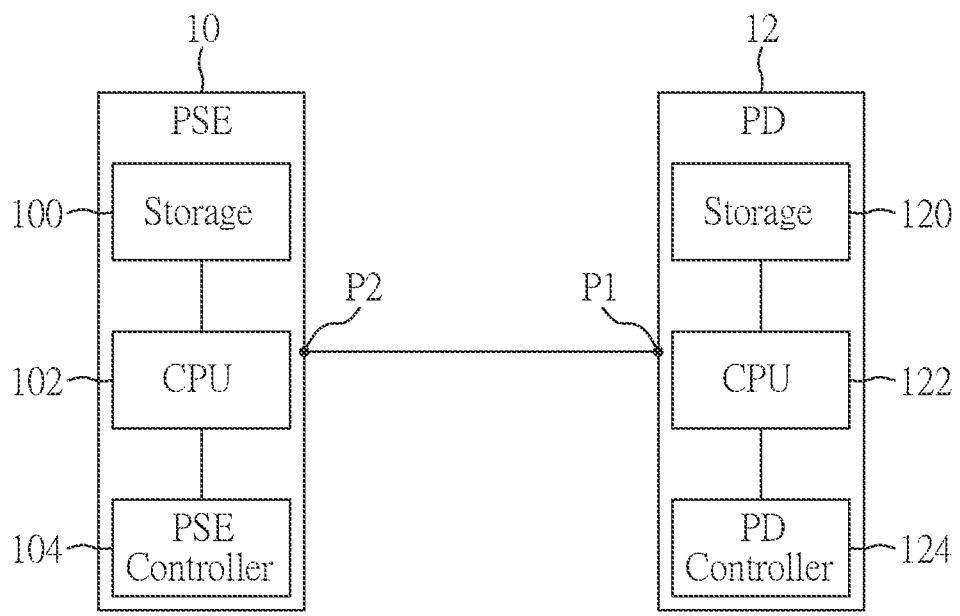
FIG. 1 is a block diagram of a PoE system provided by an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
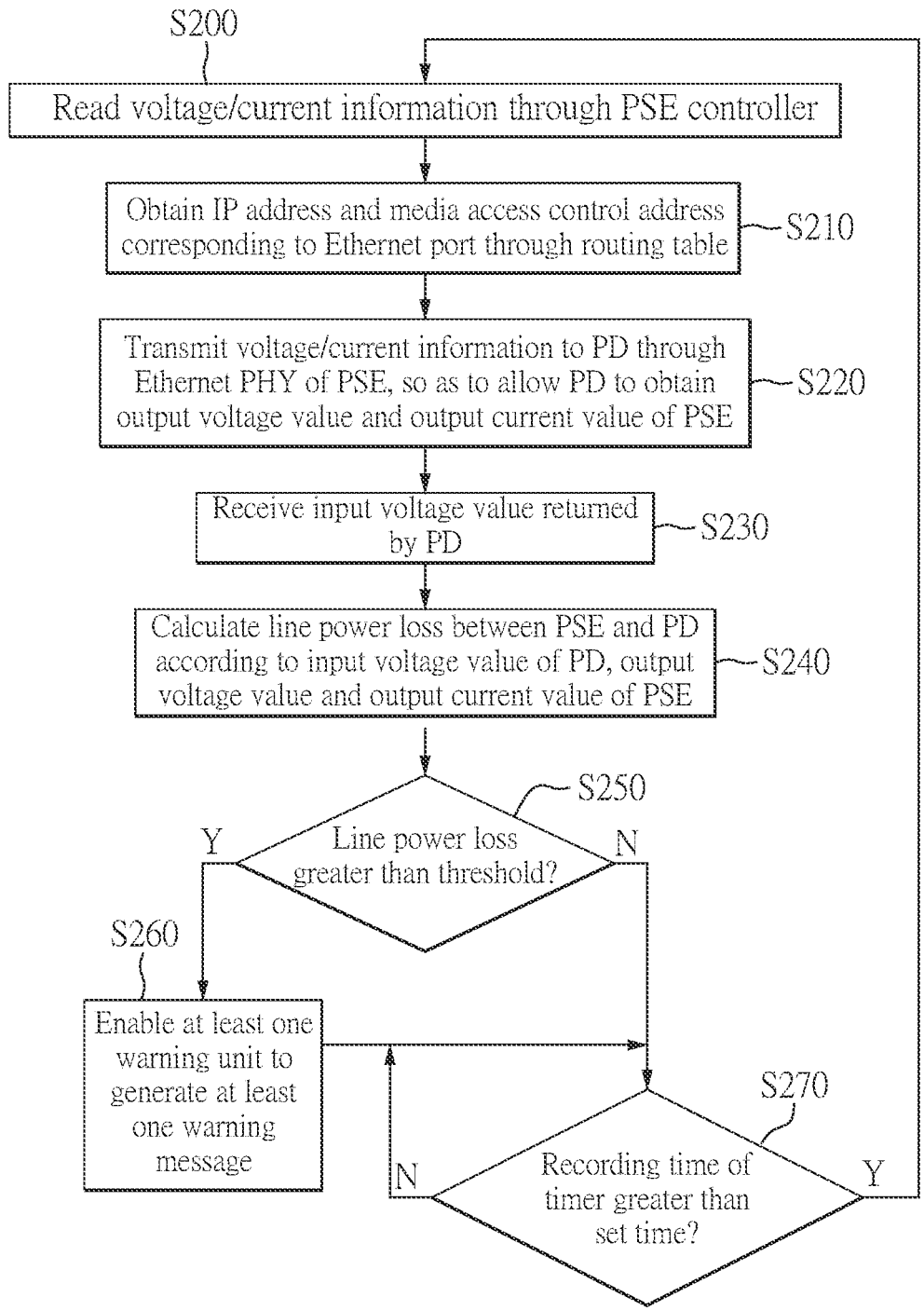
FIG. 2 is a flowchart of steps of a line loss detection method provided by a first embodiment of the present disclosure.

Reference is made to FIG. 1 and FIG. 2 together. FIG. 1 is a block diagram of a Power over Ethernet (PoE) system provided by an embodiment of the present disclosure, and FIG. 2 is a flowchart of steps of a line loss detection method provided by a first embodiment of the present disclosure. The line loss detection method of FIG. 2 can be implemented in a power sourcing equipment (PSE) 10 of FIG. 1, but the present disclosure does not limit that the PSE 10 of FIG. 1 can only perform the line loss detection method of FIG. 2, and the PSE 10 of FIG. 1 is coupled with a powered device (PD) 12 of a PoE system 1 through an Ethernet port P2. As shown in FIG. 1, the PSE 10 includes a storage 100 and a central processing unit (CPU) 102. The storage 100 stores at least one first application program (not shown in FIG. 1). The central processing unit 102 is coupled with the storage 100 for executing the first application program, such that the PSE 10 executes the line loss detection method of FIG. 2. In addition, the PSE 10 can further include a PSE controller 104 coupled with the CPU 102, for recording voltage/current information of the PD 12 supplied by the PSE 10 through the Ethernet port P2, that is, an output voltage value and an output current value.

As shown in FIG. 2, the PSE 10 receives the input voltage value returned by the PD 12 in step S230, and the PSE 10 can calculate the line power loss between the PSE 10 and the PD 12 by using the CPU 102 according to the input voltage value of the PD 12, the output voltage value and the output current value of the PSE 10 in step S240. Specifically, the PSE 10 transmits the voltage/current information to the PD 12 in a form of packet, such that the PD 12 returns the input voltage value in the form of packet in response to the voltage/current information. Therefore, before step S230, the line loss detection method of FIG. 2 can further include steps S200 to S220. In step S200, the PSE 10 can configure the CPU 102 to read the voltage/current information through a PSE controller 104, and obtain an Internet protocol address and a media access control address corresponding to the Ethernet port P2 through a routing table. Then, in step S220, the PSE 10 can configure the CPU 102 to transmit the voltage/current information to the PD 12 in the form of packet through an Ethernet physical layer (PHY) of the PD 12, thereby allowing the PD 12 to obtain the output voltage value and the output current value of the PSE 10.

For the convenience of the following description, the output voltage value and the output current value of the PSE 10 used in this embodiment are $V_{PSE}=52V$ and $I_{PSE}=0.35$ A, and the input voltage value of the PD 12 is $V_{PD}2V_F=46.6$ V as an example, but they are not used to limit the present disclosure. Therefore, the CPU 102 calculates a line impedance between the PSE 10 and the PD 12, by subtracting the output voltage value of the PSE 10 with the input voltage value of the PD 12 to obtain a difference and dividing the difference by the output current value of the PSE 10, as $R_{CABLE}=15.43$ ohm, that is, $R_{CABLE}=(V_{PSE}-V_{PD}+2V_F)/I_{PSE}=(52V-46.6V)/0.35$ A=15.43 ohm, and the CPU 102 multiplies the line impedance by a square of the output current value of PSE 10 to calculate a line power loss between PSE 10 and PD 12 as $P_{CABLE}=1.89$ W, that is, $P_{CABLE}=(I_{PSE})^2 \times R_{CABLE}=(0.36 \text{ A})^2 \times 15.43$ ohm=1.89 W. In other embodiments, the CPU 102 can also subtract an output power of the PSE 10 with a power consumption of the PD 12 to calculate the line power loss between the PSE 10 and the PD 12, but the present disclosure is not limited thereto.

Finally, in order to provide a warning when there is a problem with a power supply line, the PSE 10 can further perform step S250 to determine whether the line power loss is greater than a threshold. In response to the line power loss being greater than the threshold, the PSE 10 executes step S260 to enable at least one warning unit to generate at least one warning message, and after step S260 is executed, the PSE 10 executes step S270 to determine whether a recording time of a timer is greater than a set time; and in response to the line power loss not being greater than the threshold, the PSE 10 directly executes step S270 to determine whether the recording time of the timer is greater than the set time. For example, when the line power loss is greater than the threshold, the PSE 10 can enable at least one light-emitting diode (LED) to display a warning light by the CPU 102, but the present disclosure is not limited thereto. In addition, in response to the recording time of the timer not being greater than the set time, the PSE 10 returns to step S270, and until the recording time of the timer is greater than the set time, the PSE 10 returns to step S200. It can be seen that step S270 is only for effectively controlling a time point when the PSE 10 re-executes the line loss detection method of FIG. 2. As a matter of course, in other embodiments, the PSE 10 can also omit steps S250, S260, and S270, but only needs to perform long-term power supply quality analysis based on the data collected in steps S200 to S240.

Figure 3:
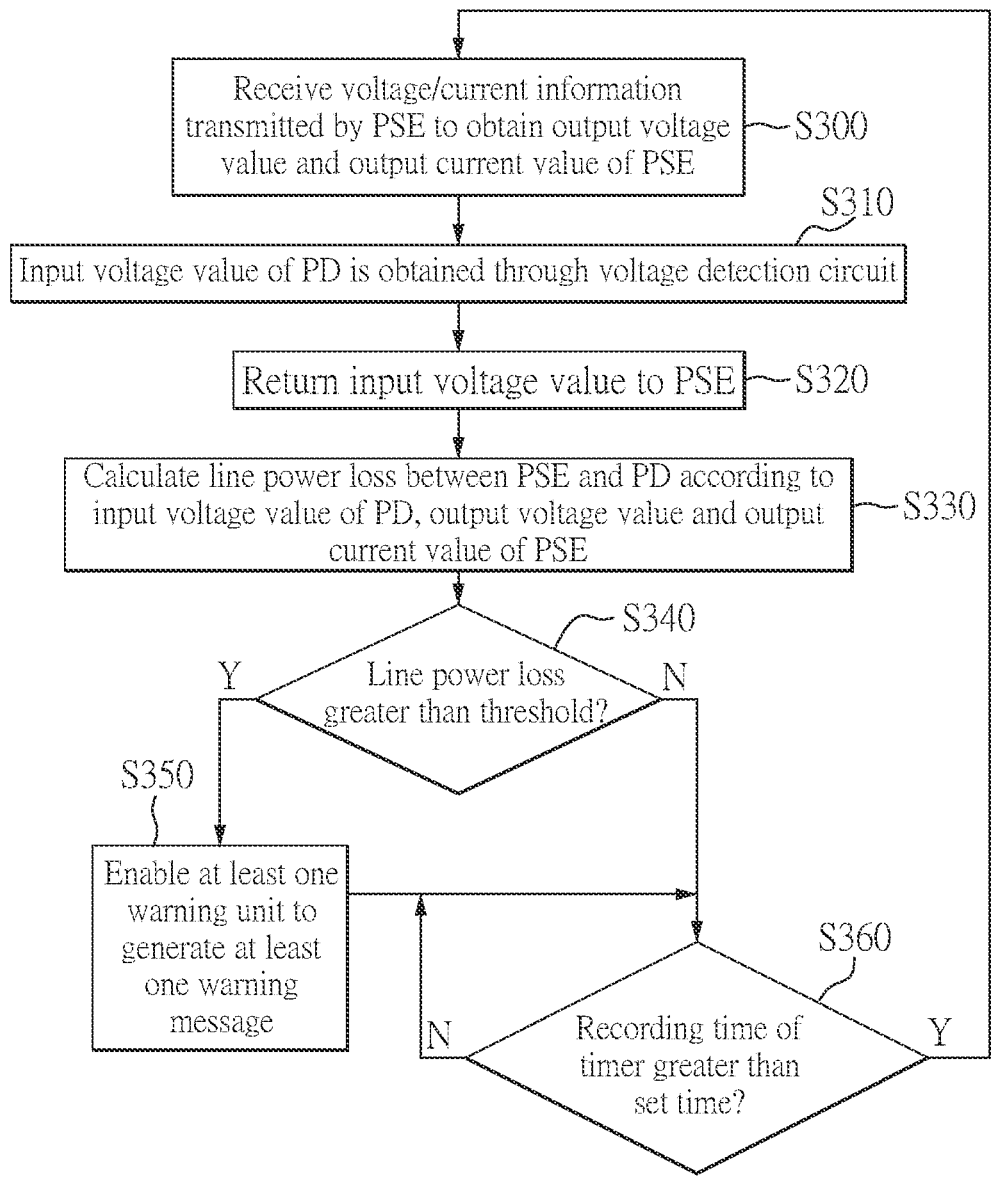
FIG. 3 is a flowchart of steps of a line loss detection method provided by a second embodiment of the present disclosure.

In contrast, reference is made to FIG. 3, in which FIG. 3 is a flowchart of steps of a line loss detection method provided by a second embodiment of the present disclosure. The line loss detection method of FIG. 3 can be implemented in the PD 12 of FIG. 1, but the present disclosure does not limit that the PD 12 of FIG. 1 to only perform the line loss detection method of FIG. 3, and the PD 12 of FIG. 1 is coupled with the PSE 10 through an Ethernet port P1. As shown in FIG. 1, the PD 12 can include a storage 120 and a central processing unit (CPU) 122. The storage 120 stores at least one second application program (not shown in FIG. 1). The CPU 122 is coupled with the storage 120 for executing the second application program, such that the PD 12 executes the line loss detection method of FIG. 3. In addition, the PD 12 can further include at least one PD controller 124 coupled with the CPU 122. As for the details of the PD controller 124, other embodiments will be used hereinafter for illustrating the details, which will not be repeated here.

As shown in FIG. 3, in step S300, the PD 12 receives voltage/current information transmitted by the PSE 10 to obtain an output voltage value and an output current value of the PSE 10, and in step S310, an input voltage value of the PD 12 is obtained through a voltage detection circuit (not shown in FIG. 1). Next, in step S330, the PD 12 can calculate the line power loss between the PSE 10 and the PD 12 by the CPU 122 according to the input voltage value of the PD 12, the output voltage value and the output current value of the PSE 10. Similarly, the PD 12 can further return the input voltage value to the PSE 10 in the form of packet by the CPU 122 in response to the voltage/current information. Therefore, before step S330, the line loss detection method of FIG. 3 can further include step S320. In step S320, the PD 12 can return the input voltage value to the PSE 10 by the CPU 122 in the form of packet.

Figure 4:
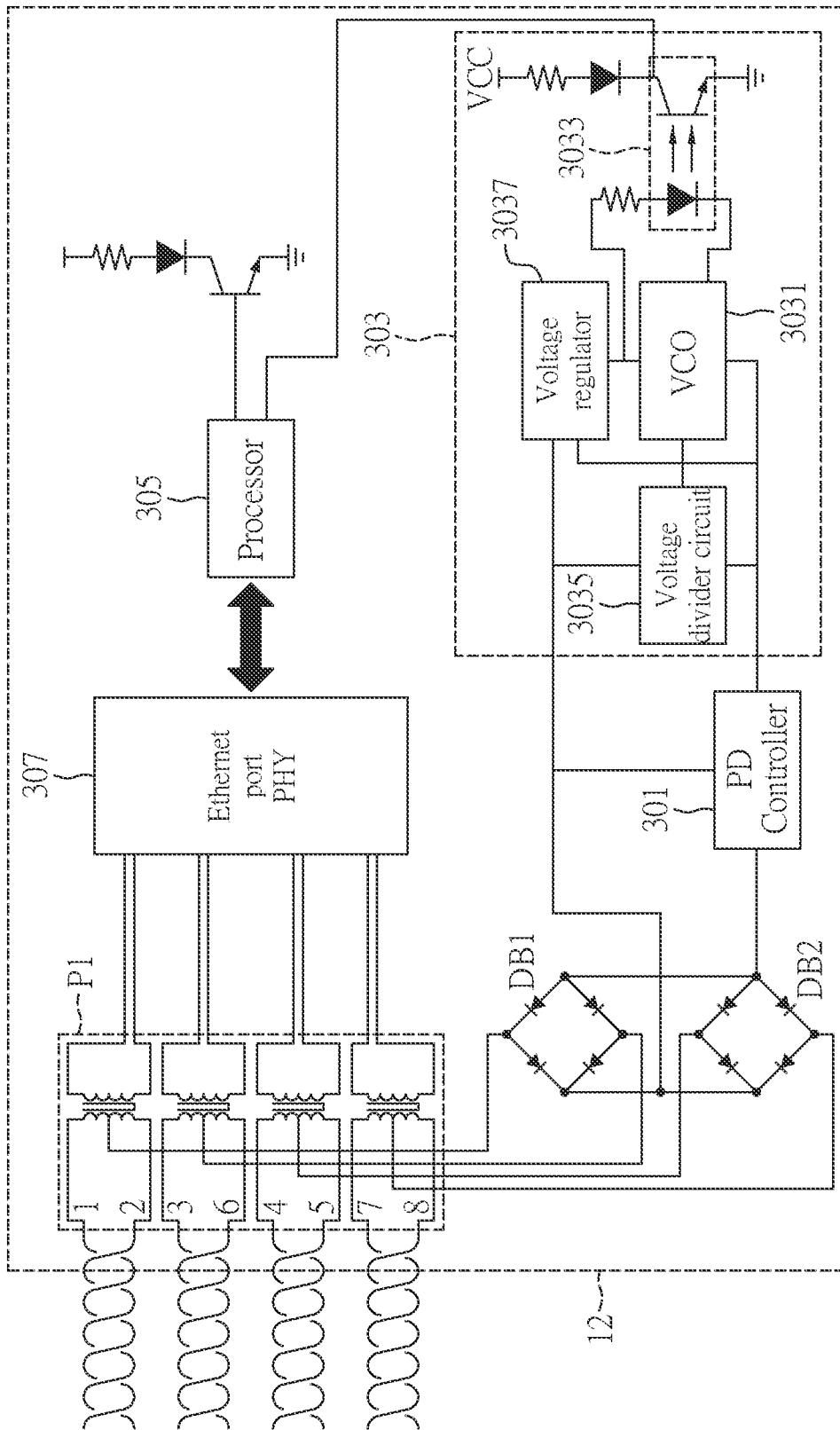
FIG. 4 is a schematic circuit diagram of a voltage detection circuit for a single-signature PD provided by an embodiment of the present disclosure.
Figure 5:
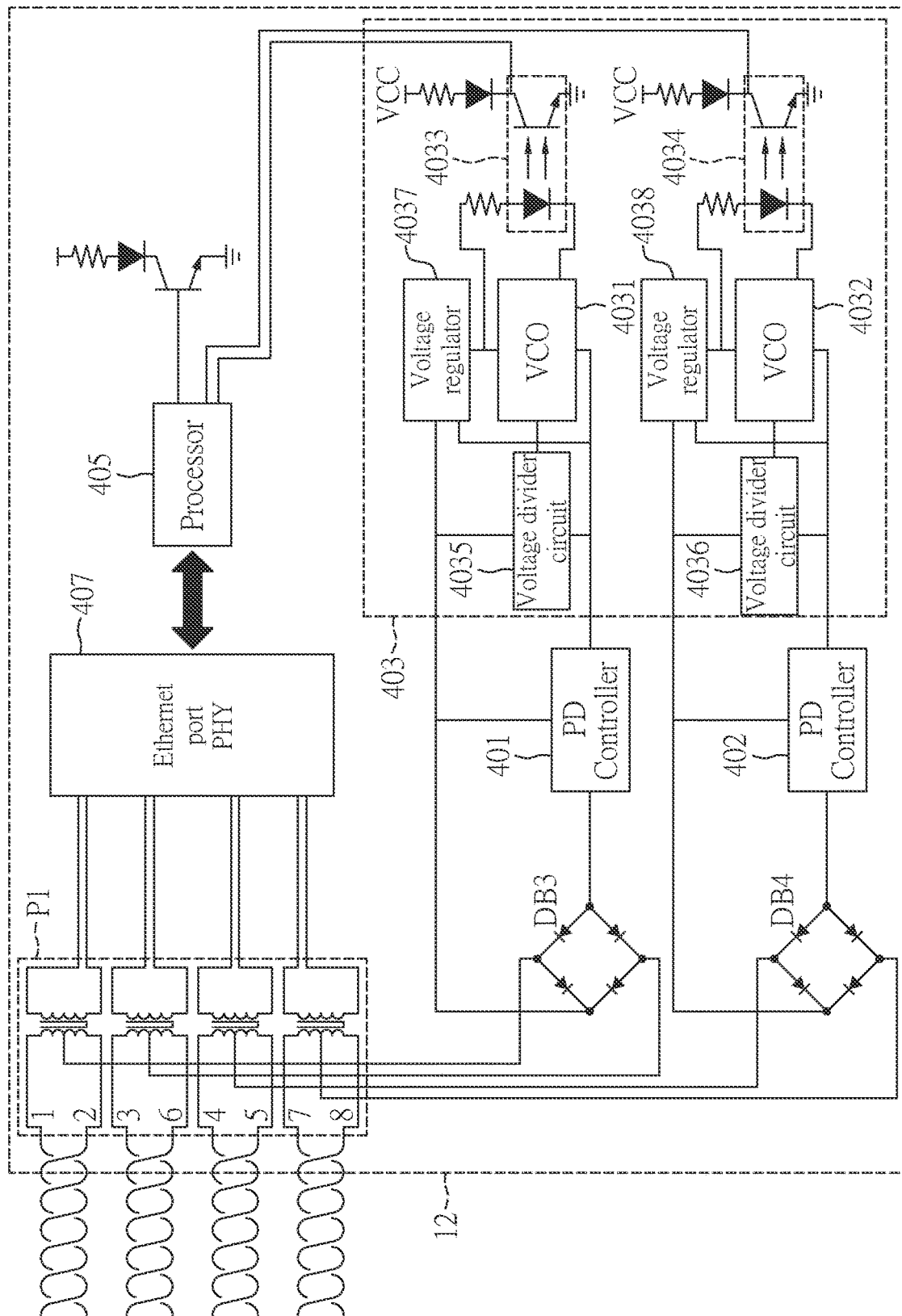
FIG. 5 is a schematic circuit diagram of a voltage detection circuit for a dual-signature PD provided by an embodiment of the present disclosure.

Reference is made to FIGS. 4 and 5 together, FIGS. 4 and 5 will be used to explain an operating principle of the voltage detection circuit. It is worth mentioning that, since IEEE 802.3bt currently provides two PD topologies, which are called Single-Signature and Dual-Signature, respectively, thus FIGS. 4 and 5 are schematic circuit diagrams of the voltage detection circuit for the single-signature PD 12 and the dual-signature PD 12 provided by the embodiment of the present disclosure. As shown in FIG. 4, the single-signature PD 12 can include diode bridges DB1, DB2, and a PD controller 301. The PD controller 301 is coupled with the Ethernet port P1 through the diode bridges DB1 and DB2. In other words, when the PSE 10 supplies power to the single-signature PD 12 through a cable connected to the Ethernet port P1, the PD controller 301 can receive corresponding voltage. However, since the operating principle of the single-signature PD 12 is known to those skilled in the art, the details of the diode bridges DB1, DB2, and PD controller 301 will not be repeated. In short, the voltage detection circuit 303 of the single-signature PD 12 can include a voltage controlled oscillator (VCO) 3031 and an optocoupler 3033.

The VCO 3031 is coupled with the Ethernet port P1 through the PD controller 301 and the diode bridges DB1 and DB2, and is configured to convert the voltage received by the PD controller 301 into an output frequency. The optocoupler 3033 is coupled with the VCO 3031 for transmitting the output frequency converted by the VCO 3031 to a processor 305, such as the CPU 122 of FIG. 1, of the single-signature PD 12 using light as a medium, such that the processor 305 of the single-signature PD 12 can use an internal counter (not shown in FIG. 4) to count the output frequency to obtain a detection voltage value. It is worth mentioning that the voltage detection circuit 303 can further include a voltage divider circuit 3035 and a voltage regulator 3037. The voltage divider circuit 3035 is coupled between the PD controller 301 and the VCO 3031, and the voltage regulator 3037 is coupled between the voltage divider circuit 3035 and the VCO 3031. As for the operating principles of the voltage divider circuit 3035 and the voltage regulator 3037 are known to those skilled in the art, therefore, the details of the voltage divider circuit 3035 and the voltage regulator 3037 will not be repeated.

In contrast, the dual-signature PD 12 of FIG. 5 can include diode bridges DB3, DB4, and PD controllers 401, 402, and since operating principles of the dual-signature PD 12 is also known to those skilled in the art, the details associated to the diode bridges DB3, DB4 and PD controllers 401, 402 will not be repeated. It should be noted that the dual-signature PD 12 requires two parallel PD interfaces to gather the power supplied by the PSE 10 through the cable connected to the Ethernet port P1, therefore, the voltage detection circuit 403 of the dual-signature PD 12 can include voltage controlled oscillators (VCOs) 4031 and 4032 and optocouplers 4033 and 4034. The VCO 4031 is coupled with the Ethernet port P1 through the PD controller 401 and the diode bridge DB3, and is configured to convert a voltage received by the PD controller 401 into a first output frequency. In addition, the VCO 4032 is coupled with the Ethernet port P1 through the PD controller 402 and the diode bridge DB4, and is configured to convert a voltage received by the PD controller 402 into a second output frequency. The optocouplers 4033 and 4034 are respectively coupled with the VCOs 4031 and 4032, and are configured to transmit the first output frequency and the second output frequency to the processor 405, such as the processor 122 shown in FIG. 1, of the dual-signature PD 12 using light as a medium, such that the CPU 122 of the dual-signature PD 12 can use an internal counter (not shown in FIG. 5) to count the first output frequency and the second output frequency to obtain detection voltage values.

Similarly, the voltage detection circuit 403 can further include voltage divider circuits 4035 and 4036 and voltage regulators 4037 and 4038. Since the details are the same as the previous content, the repeated descriptions are omitted hereinafter. That is, the voltage detection circuits of FIGS. 4 and 5 can reduce unnecessary line power consumption, and not only the number and configuration of PD controllers in the PD 12 can be determined by the PD topology, the number and configuration of voltage controlled oscillators, optocouplers, voltage divider circuits and voltage regulators in the voltage detection circuit can also be determined by the PD topology. In addition, this embodiment assumes that a forward voltage of a single diode bridge is $V_F=0.8V$, and for the convenience of the following description, this embodiment uses the detection voltage value of $V_{PD}=45V$ as an example, but it is not used to limit the present disclosure. Therefore, the PD 12 can calculate, by adding the detection voltage value with the forward voltages of the two diode bridges through the CPU 122, the input voltage value as $V_{PD}+2V_F=46.6V$, that is, $V_{PD}+2V_F=V_{PD}+2V_F=45V+1.6V=46.6V$. In other words, the CPU 122 can compensate the detection voltage value with voltage drops of the diode bridges to obtain the input voltage value of the PD 12. Therefore, the CPU 122 can calculate a line impedance between the PSE and the PD, by minusing the output voltage value of the PSE 10 with the forward voltages of the two diode bridges to obtain a difference and dividing the difference by the output current value of the PSE 10, as $R_{CABLE}=15.43$ ohm, that is, $R_{CABLE}=(V_{PSE}-V_{PD}-2V_F)/I_{PSE}=(52V-46.6V)/0.35 A=15.43$ ohm, and the CPU 102 can multiply the line impedance by a square of the output current value of PSE 10 to calculate a line power loss between the PSE 10 and the PD 12 as $P_{CABLE}=1.89$ W.

As mentioned above, in order to provide a warning when there is a problem with the power supply line, the PD 12 can further perform step S340 to determine whether the line power loss is greater than a threshold. In response to the line power loss being greater than the threshold, the PD 12 executes step S350 to enable at least one warning unit to generate at least one warning message, and after step S350 is executed, the PD 12 executes step S360 to determine whether a recording time of a timer is greater than a set time; and in response to the line power loss not being greater than the threshold, the PD 12 directly executes step S360 to determine whether the recording time of the timer is greater than the set time. In response to the recording time of the timer not being greater than the set time, the PD 12 returns to step S360, and until the recording time of the timer is greater than the set time, the PSE 10 returns to step S300. Similarly, in other embodiments, the PD 12 can also omit steps S340, S350, and S360, but only needs to perform long-term power supply quality analysis based on the data collected in steps S300 to S330.

Figure 6:
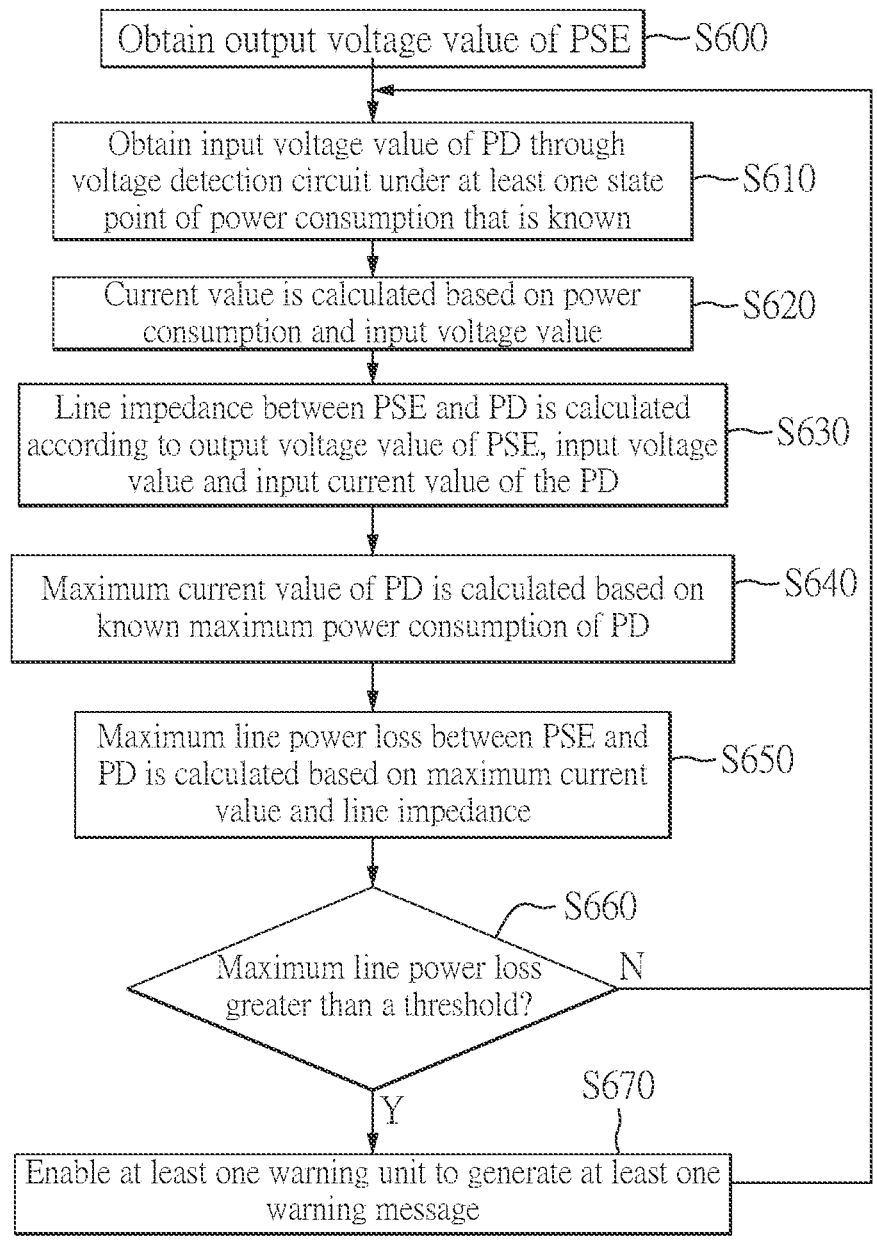
FIG. 6 is a flowchart of steps of a line loss detection method provided by a third embodiment of the present disclosure.

On the other hand, reference is made to FIG. 6, in which FIG. 6 is a flowchart of steps of a line loss detection method provided by a third embodiment of the present disclosure. The line loss detection method of FIG. 6 can also be implemented in the PD 12 of FIG. 1, but the present disclosure is not limited thereto. In addition, industries currently use a power injector or a mid-span together with the existing Ethernet switch, so that the existing Ethernet switch can be indirectly upgraded to the switch that supports PoE. Therefore, the PSE 10 in FIG. 1 can also be a mid-span PSE. As shown in FIG. 6, in step S600, the PD 12 can obtain the output voltage value of the PSE 10. For example, the PD 12 can obtain the output voltage value of the mid-span PSE through a graphical user interface (GUI). In other words, the user can input an output voltage value of the power supply or the mid-span to the CPU 122 of the PD 12 through the GUI of the PD 12, but the present disclosure is not limited thereto, and in step S610, the PD 12 can obtain the input voltage value of the PD 12 through the voltage detection circuit under at least one state point of a power consumption that is known.

Next, in step S620, the current value of the PD 12 is calculated based on the power consumption and the input voltage value, and in step S630, a line impedance between the PSE 10 and the PD 12 is calculated according to the output voltage value of the PSE 10, the input voltage value and the input current value of the PD 12. Next, in step S640, a maximum current value of the PD 12 is calculated based on a known maximum power consumption of the PD 12, and in step S650, a maximum line power loss between the PSE 10 and the PD 12 is calculated based on the maximum current value and the line impedance. For the convenience of the following description, this embodiment uses the at least one state point of the known power consumption as a single state point, and the single state point is taken as an example at a time point that the PD 12 operates in idle mode, but it is not used to limit the present disclosure. Therefore, when it is given that the power consumption of the PD 12 in the idle mode is $P_{PD-IDLE}$=4.6 W, and the detection voltage value of the PD 12 in the idle mode obtained by the voltage detection circuit is $V_{PD-IDLE}$=44V, the CPU 122 can add the detection voltage value with the forward voltages of the two diode bridges to calculate the input voltage value of the PD 12 as $V_{PD}+2V_F$=45.6V, and the CPU 122 can also divide the power consumption by a sum of the detection voltage value added by the forward voltages of the two diode bridges, to calculate the current value of the PD 12 in the idle mode as $I_{PD-IDLE}$=0.1 A, that is, $I_{PD-IDLE}=P_{PD-IDLE}/(V_{PD-IDLE}+2V_F)$=4.6 W/(44V+1.6V)=0.1 A.

Similarly, when the output voltage value of the PSE 10 obtained by the PD 12 is $V_{PSE}$=50V, the CPU 122 can subtract the output voltage value of the PSE 10 with the detection voltage value and the forward voltages of the two diode bridges to obtain a difference, and divide the difference by the current value of the PD 12 to calculate an impedance of the PD 12 in the idle mode as the line impedance $R_{CABLE}$ between the PSE 10 and the PD 12, that is, $R_{CABLE}=R_{PD-IDLE}=(V_{PSE}-V_{PD-IDLE}-2V_F)/I_{PD-IDLE}$= (50V−44V−1.6V)/0.1 A=44 ohm. Then, when the known maximum power consumption of the PD 12 is $P_{PD-MAX}$=18 W, the CPU 122 can divide the maximum power consumption by the output voltage value of the PSE 10 to calculate the maximum current value of the PD 12 as $I_{PD-MAX}$=0.36 A, that is, $I_{PD-MAX}=P_{PD-MAX}/V_{PSE}$=18 W/50V=0.36 A, and the CPU 122 can multiply the line impedance by the square of the maximum current value to calculate the maximum line power loss between the PSE 10 and the PD 12 as $P_{CABLE-MAX}$=5.7 W, i.e., $P_{CABLE-MAX}=(I_{PD-MAX})^2 \times R_{CABLE}$= (0.36 A)²×44 ohm=5.7 W.

It should be noted that when it is known that the at least one state point of the power consumption is a plurality of state points, the CPU 122 obtains the input voltage value of the PD 12 at each of the plurality of state points through the voltage detection circuit, such as $V_{PD-STATUS-1}$ to $V_{PD-STATUS-N}$, where N is an integer greater than 1, and the CPU 122 can calculate, according to the known power consumption and the input voltage value of the PD 12 at each state point, current values of the PD 12 at each of the state point, such as $I_{PD-STATUS-1}$ to $I_{PD-STATUS-N}$, and then the CPU 122 can calculate, according to the input voltage value and the current value of the PD 12 at each state point, impedances of the PD 12 at each state point, such as $R_{PD-STATUS-1}$ to $R_{PD-STATUS-N}$, and an average value of these impedances, namely $(R_{PD-STATUS-1}+R_{PD-STATUS-2}+\ldots+R_{PD-STATUS-N})/N$, is taken as the line impedance between the PSE 10 and the PD 12. Since the calculation details are the same as those mentioned above, the repeated descriptions are omitted hereinafter. In short, if there are more state points of known power consumption, the more voltage/current information the PD 12 can obtain, so that the calculated line impedance is more accurate, but the present disclosure does not limit the number of state points used for detection.

Similarly, in order to provide a warning when there is a problem with the power supply line, the PD 12 can further perform step S660 to determine whether the maximum line power loss is greater than a threshold. In response to the maximum line power loss not being greater than the threshold, the PD 12 returns to step S610; in response to the maximum line power loss being greater than the threshold, the PD 12 executes step S670 to enable at least one warning unit to generate at least one warning message, and after step S670 is executed, the PD 12 returns to step S610. In addition, the PD 12 can also obtain the threshold value through the GUI. In other words, the user can set the threshold through the GUI of the PD 12, but the present disclosure is not limited thereto. In other embodiments, the PD 12 can also omit steps S660 and S670, but only needs to perform long-term power supply quality analysis based on the data collected in steps S600 to S650.

In conclusion, the embodiment of the present disclosure provides the PSE, the PD, and the line loss detection method for the PoE. The PD receives voltage/current information transmitted by the PSE to obtain the output voltage value and the output current value of the PSE, and the PSE receives the input voltage value returned by the PD, such that the PSE and the PD can both calculate the line power loss between the PSE and the PD based on the input voltage value of the PD, the output voltage value and the output current value of the PSE; alternatively, the PD obtains the input voltage value through the voltage detection circuit under the at least one state point that the power consumption is known, and calculates, according to the output voltage value of the PSE and the known maximum power consumption of the PD, the maximum line power loss between the PSE and the PD.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A line loss detection method for Power over Ethernet (PoE), performed in a power sourcing equipment (PSE) of a PoE system, and the PSE being coupled with a powered device (PD) of the PoE system through an Ethernet port of the PSE, the line loss detection method comprising:
receiving an input voltage value transmitted back from the PD; and
calculating a line power loss between the PSE and the PD according to the input voltage value of the PD, and an output voltage value and an output current value of the PSE;
wherein the PD obtains the input voltage value by a voltage detection circuit, and the voltage detection circuit at least includes:
a voltage controlled oscillator coupled with an Ethernet port on the PD through a PD controller and at least one diode bridge, wherein the PD is coupled with the PSE through the Ethernet port, and the voltage controlled oscillator is configured to convert a voltage received by the PD controller into an output frequency;
an optocoupler coupled with the voltage controlled oscillator and configured to transmit the output frequency to a processor of the PD using light as a medium, so as to allow the processor of the PD to use an internal counter to count the output frequency to obtain a detection voltage value;
a voltage divider circuit coupled between the PD controller and the voltage controlled oscillator; and
a voltage regulator coupled between the voltage divider circuit and the voltage controlled oscillator.

2. The line loss detection method according to claim 1, wherein the PSE transmits a voltage/current information to the PD in the form of a packet, such that the PD returns the input voltage value in the form of the packet in response to the voltage/current information.

3. The line loss detection method according to claim 2, further comprising:
configuring a central processing unit (CPU) to read the voltage/current information through a PSE controller of the PSE, and obtain an Internet protocol address and a media access control address corresponding to the Ethernet port through a routing table; and
transmitting the voltage/current information to the PD in the form of the packet through an Ethernet physical layer of the PSE, so as to allow the PD to obtain the output voltage value and the output current value of the PSE.

4. The line loss detection method according to claim 3, wherein the PSE calculates a line impedance between the PSE and the PD through the CPU by subtracting the output voltage value with the input voltage value to obtain a difference, and dividing the difference by the output current value, and the PSE calculates the line power loss between the PSE and the PD through the CPU by multiplying a square of the output current value with the line impedance.

5. A line loss detection method for Power over Ethernet (PoE), performed in a powered device (PD) of a PoE system, the PD being coupled with a power sourcing equipment (PSE) of the PoE system, and the line loss detection method comprising:
receiving a voltage/current information transmitted from the PSE to obtain an output voltage value and an output current value of the PSE; and
obtaining an input voltage value of the PD by a voltage detection circuit, and calculating a line power loss between the PSE and the PD according to the input voltage value of the PD, the output voltage value and the output current value of the PSE;
wherein the voltage detection circuit at least includes:
a voltage controlled oscillator coupled with an Ethernet port on the PD through a PD controller and at least one diode bridge, wherein the PD is coupled with the PSE through the Ethernet port, and the voltage controlled oscillator is configured to convert a voltage received by the PD controller into an output frequency;
an optocoupler coupled with the voltage controlled oscillator and configured to transmit the output frequency to a processor of the PD using light as a medium, so as to allow the processor of the PD to use an internal counter to count the output frequency to obtain a detection voltage value;
a voltage divider circuit coupled between the PD controller and the voltage controlled oscillator; and
a voltage regulator coupled between the voltage divider circuit and the voltage controlled oscillator.

6. The line loss detection method according to claim 5, wherein the PD further transmits the input voltage value back to the PSE in the form of a packet by a central processing unit (CPU) of the PD in response to the voltage/current information.

7. The line loss detection method according to claim 6, wherein the PD calculates the input voltage value by adding the detection voltage value with at least one forward voltage of the at least one diode bridge by the CPU.

8. The line loss detection method according to claim 7, wherein the CPU further calculates a line impedance between the PSE and the PD by subtracting the output voltage value with the detection voltage value and the at least one forward voltage to obtain a difference, and dividing the difference with the output current value, and the CPU calculates the line power loss between the PSE and the PD by multiplying a square of the output current with the line impedance.

9. A line loss detection method for Power over Ethernet (PoE), performed in a powered device (PD) of a PoE system, the PD being coupled with a power sourcing equipment (PSE) of the PoE system, and the line loss detection method comprising:
obtaining an output voltage value of the PSE, and obtaining an input voltage value of the PD through a voltage detection circuit under at least one state point of a power consumption that is known;
calculating a current value of the PD according to the power consumption and the input voltage value, and calculating a line impedance between the PSE and the PD according to the output voltage value of the PSE, the input voltage value of the PD, and the current value of the PD; and
calculating a maximum current value of the PD according to a maximum power consumption of the PD that is known, and calculating a maximum line power loss between the PSE and the PD according to the maximum current value and the line impedance;
wherein the voltage detection circuit at least includes:
a voltage controlled oscillator coupled with an Ethernet port on the PD through a PD controller and at least one diode bridge, wherein the PD is coupled with the PSE through the Ethernet port, and the voltage controlled oscillator is configured to convert a voltage received by the PD controller into an output frequency;
an optocoupler coupled with the voltage controlled oscillator and configured to transmit the output frequency to a processor of the PD using light as a medium, so as to allow the processor of the PD to use an internal counter to count the output frequency to obtain a detection voltage value;
a voltage divider circuit coupled between the PD controller and the voltage controlled oscillator; and
a voltage regulator coupled between the voltage divider circuit and the voltage controlled oscillator.

10. The line loss detection method according to claim 9, wherein the PD calculates the input voltage value through a central processing unit (CPU) by adding the detection voltage value with at least one forward voltage of the at least one diode bridge, in response to the at least one state point of the power consumption that is known being a plurality of state points, the CPU obtains the input voltage value of the PD at each of the plurality of state points through the voltage detection circuit, the CPU calculates the current value of the PD at each of the plurality of state points according to the power consumption and the input voltage value of the PD at each of the plurality of state points, and the CPU calculates an impedance of the PD at each of the plurality of state points according to the input voltage value and the current value of the PD at each of the plurality of state points, and uses an average value of the impedances as the line impedance between the PSE and the PD.

11. A power sourcing equipment (PSE) of a Power over Ethernet (PoE) system, coupled with a powered device (PD) of the PoE system through an Ethernet port of the PSE, the PSE comprising:
a storage configured to store at least one application program; and
a central processing unit (CPU), coupled with the storage and configured to execute the at least one application program, so as to allow the PSE to perform a line loss detection method including:
receiving an input voltage value transmitted back from the PD; and
calculating a line power loss between the PSE and the PD according to the input voltage value of the PD, and an output voltage value and an output current value of the PSE;
wherein the PD obtains the input voltage value by a voltage detection circuit, and the voltage detection circuit at least includes:
a voltage controlled oscillator coupled with an Ethernet port on the PD through a PD controller and at least one diode bridge, wherein the PD is coupled with the PSE through the Ethernet port, and the voltage controlled oscillator is configured to convert a voltage received by the PD controller into an output frequency;
an optocoupler coupled with the voltage controlled oscillator and configured to transmit the output frequency to a processor of the PD using light as a medium, so as to allow the processor of the PD to use an internal counter to count the output frequency to obtain a detection voltage value;
a voltage divider circuit coupled between the PD controller and the voltage controlled oscillator; and
a voltage regulator coupled between the voltage divider circuit and the voltage controlled oscillator.

12. The PSE according to claim 11, wherein the PSE transmits the voltage/current information to the PD in the form of a packet, such that the PD returns the input voltage value in the form of the packet in response to the voltage/current information.

13. The PSE according to claim 12, wherein the PSE calculates a line impedance between the PSE and the PD through the CPU by subtracting the output voltage value with the input voltage value to obtain a difference, and dividing the difference by the output current value, and the PSE calculates the line power loss between the PSE and the PD through the CPU by multiplying a square of the output current value with the line impedance.

14. A powered device (PD) of a Power over Ethernet (PoE) system, coupled with a power sourcing equipment (PSE) of the PoE system, the PD comprising:
a storage configured to store at least one application program; and
a central processing unit (CPU) coupled with the storage and configured to execute the at least one application program, so as to allow the PD to perform a line loss detection method including:
receiving a voltage/current information transmitted from the PSE to obtain an output voltage value and an output current value of the PSE; and
obtaining an input voltage value of the PD by a voltage detection circuit, and calculating a line power loss between the PSE and the PD according to the input voltage value of the PD, the output voltage value and the output current value of the PSE;
wherein the voltage detection circuit at least includes:
a voltage controlled oscillator coupled with an Ethernet port on the PD through a PD controller and at least one diode bridge, wherein the PD is coupled with the PSE through the Ethernet port, and the voltage controlled oscillator is configured to convert a voltage received by the PD controller into an output frequency;
an optocoupler coupled with the voltage controlled oscillator and configured to transmit the output frequency to a processor of the PD using light as a medium, so as to allow the processor of the PD to use an internal counter to count the output frequency to obtain a detection voltage value;
a voltage divider circuit coupled between the PD controller and the voltage controlled oscillator; and
a voltage regulator coupled between the voltage divider circuit and the voltage controlled oscillator.

15. The PD according to claim 14, further transmitting the input voltage value back to the PSE in the form of a packet by the CPU of the PD in response to the voltage/current information.

16. The PD according to claim 15, wherein the PD calculates the input voltage value by adding the detection voltage value with at least one forward voltage of the at least one diode bridge through the CPU.

17. The PD according to claim 16, wherein the CPU further calculates a line impedance between the PSE and the PD by subtracting the output voltage value with a difference between the detection voltage value and the at least one forward voltage to obtain a difference, and dividing the difference with the output current value, and the CPU calculates the line power loss between the PSE and the PD by multiplying a square of the output current with the line impedance.

* * * * *